(12) United States Patent
Galbraith (10) Patent No.: US 7,291,271 B2
(45) Date of Patent: Nov. 6, 2007

(54) MESO-FREQUENCY TRAVELING WAVE ELECTRO-KINETIC CONTINUOUS ADSORPTION SYSTEM

(75) Inventor: S. Douglas Galbraith, Holbrook, PA (US)

(73) Assignee: Separation Design Group, LLC, Waynesburg, PA (US)

( * ) Notice: Subject to any disclaimer, the term of this patent is extended or adjusted under 35 U.S.C. 154(b) by 238 days.

(21) Appl. No.: 10/730,278

(22) Filed: Dec. 9, 2003

(65) Prior Publication Data

US 2005/0121393 A1    Jun. 9, 2005

(51) Int. Cl.
    *B01D 15/00* (2006.01)
(52) U.S. Cl. .............. 210/670; 210/748; 204/551; 96/143; 165/104.15
(58) Field of Classification Search ......... 204/551; 210/748, 670; 96/143; 165/104.15
See application file for complete search history.

(56) References Cited

U.S. PATENT DOCUMENTS

| | | | |
|---|---|---|---|
| 3,359,707 A | 12/1967 | Jean ............................ 55/33 |
| 3,727,375 A * | 4/1973 | Wallace ....................... 95/68 |
| 3,730,885 A * | 5/1973 | Makrides et al. ........... 204/551 |
| 3,771,234 A | 11/1973 | Forster et al. ................ 34/1 |
| 4,011,306 A | 3/1977 | Fox, Jr. ..................... 423/579 |
| 4,038,050 A | 7/1977 | Lowther ....................... 95/1 |
| 4,094,652 A | 6/1978 | Lowther ..................... 96/143 |
| 4,114,380 A | 9/1978 | Ceperley .................... 60/721 |
| 4,316,233 A | 2/1982 | Chato et al. ................ 361/233 |
| 4,322,394 A | 3/1982 | Mezey et al. ........... 423/244.11 |
| 4,954,320 A | 9/1990 | Birmingham et al. ... 422/186.04 |
| 4,964,889 A | 10/1990 | Chao ............................ 95/96 |
| 5,085,780 A | 2/1992 | Ostreicher ................ 210/683 |
| 5,335,510 A | 8/1994 | Rockenfeller et al. ....... 62/106 |
| 5,396,775 A | 3/1995 | Rockenfeller et al. ....... 62/112 |
| 5,441,716 A | 8/1995 | Rockenfeller ............. 439/299 |
| 5,490,398 A | 2/1996 | Cline .......................... 62/497 |
| 5,505,825 A * | 4/1996 | Gold et al. ................. 95/126 |
| 5,535,817 A | 7/1996 | Dunne .................... 165/104.12 |
| 5,590,538 A | 1/1997 | Hsu et al. ................... 62/51.2 |
| 5,728,457 A | 3/1998 | Frechet et al. ........... 428/310.5 |
| 5,842,356 A | 12/1998 | Pfister et al. ................ 62/480 |

(Continued)

OTHER PUBLICATIONS

Boscolo, I. et al., "Application of Ferroelectric Cathodes to Enhance the ION Yield in the Caesar Source at LNS", *Proceedings of EPAC*, 2000, 1631-1633.

(Continued)

*Primary Examiner*—Matthew O. Savage
(74) *Attorney, Agent, or Firm*—Woodcock Washburn LLP (57) ABSTRACT

The invention provides a non-cyclic, meso-frequency traveling wave electro-kinetic system capable of use in purification/separation and/or refrigeration/heat pump processes. In particular, the invention provides an adsorption system that can be used for fine or bulk chemical separations of liquid and gaseous materials. Similarly, the adsorption system can be readily adapted to function as a refrigeration/heat pump unit for use in heating and cooling systems. This reusable adsorption system provides high efficiency purification and/or cooling/heating with low energy demands and no moving parts. The invention can function in parallel or in series with other similar such adsorption units (though it can also operate as a single unit).

16 Claims, 7 Drawing Sheets

U.S. PATENT DOCUMENTS

| | | | |
|---|---|---|---|
| 5,972,077 A | 10/1999 | Judkins et al. | 95/136 |
| 6,013,164 A | 1/2000 | Paul et al. | 204/450 |
| 6,019,882 A | 2/2000 | Paul et al. | 204/450 |
| 6,200,539 B1 | 3/2001 | Sherman et al. | 422/186.04 |
| 6,271,509 B1 | 8/2001 | Dalton | 219/687 |
| 6,374,909 B1 | 4/2002 | Jeter et al. | 165/96 |
| 6,434,955 B1 | 8/2002 | Ng et al. | 62/106 |
| 6,512,215 B2 | 1/2003 | Dalton | 219/759 |
| 6,692,626 B2 | 2/2004 | Keefer et al. | 204/491 |
| 7,077,891 B2 * | 7/2006 | Jaffe et al. | 96/108 |
| 2001/0000889 A1 | 5/2001 | Yadav et al. | 204/242 |
| 2001/0008212 A1 | 7/2001 | Shepodd et al. | 204/451 |
| 2002/0023453 A1 | 2/2002 | Davidson et al. | 65/259.2 |
| 2002/0122728 A1 | 9/2002 | Darabi et al. | 417/48 |
| 2002/0170436 A1 | 11/2002 | Keefer et al. | 96/121 |
| 2003/0015092 A1 | 1/2003 | Moreau et al. | 95/96 |
| 2003/0019238 A1 | 1/2003 | Pfister et al. | 62/497 |
| 2003/0089228 A1 | 5/2003 | Kulprathipanja et al. | 95/45 |
| 2003/0116016 A1 | 6/2003 | Monzyk et al. | 95/148 |
| 2003/0131729 A1 | 7/2003 | Tonkovich et al. | 95/106 |
| 2003/0167921 A1 | 9/2003 | Golden et al. | 95/96 |
| 2003/0196885 A1 | 10/2003 | Marchitto et al. | 204/157.15 |
| 2004/0069144 A1 | 4/2004 | Wegeng et al. | 95/106 |
| 2004/0097371 A1 | 5/2004 | Jangbarwala | 502/439 |
| 2004/0107831 A1 | 6/2004 | Graham et al. | 95/96 |
| 2004/0118287 A1 | 6/2004 | Jaffe et al. | 96/121 |

OTHER PUBLICATIONS

Collins, P. et al., "Creating High Performance Conductive Composites with Carbon Nanotubes", www.Hyperioncatalysis.com, *Materials Managers Symposium*, Jun. 2004, 8 pages.

Fuhr, G. et al:, "Travelling Wave-Driven Microfabricated Electrohydrodynamic Pumps for Liquids", *J. Micromech. Microeng*, 1994, 217-226.

Gitlin, I. et al., "Pumping Based on Transverse Electrokinetic Effects", *Department of Chemistry and Chemical Biology, Harvard University, Cambridge, MA, U.S.A.* 15 pages.

Judkins, R.R. et al., "$CO_2$ Removal from Gas Streams using a Carbon Fiber Composite Molecular Sieve", $8^{th}$ *Conference on Fundamentals of Absorption*, May 2004, 14 pages.

Kong, M.G. et al., "Wave Form to Produce most Efficiency Discharges", *Dept. of Electronic and Electrical Engineering*, http://www.ee.ualberta.ca/icops2002/programest/1A.htm, Apr. 20, 2004, 1 page.

Ter Brake, H.J.M. et al., "Vibration Free 5K Sorption Cooler for ESA's Darwin Mission", *University of Twente, Faculty of Applied Physics, MESA Research Institute, Cryogenics*, Feb. 2002, 42(2), 14 pages.

Wang, R.Z. et al., "Adsorption Mechanism and Improvements of the Adsorption Equation for Adsorption Refrigeration Pairs", *International Journal of Energy Research*, 1999, 23, 887-898.

* cited by examiner

The process is referred to as continuous because it does not cycle between vessels, but, obviously, has periodicity.

MESO-FREQUENCY TRAVELING WAVE ELECTRO-KINETIC CONTINUOUS ADSORPTION SYSTEM

BACKGROUND OF THE INVENTION

1. Field of the Invention

The invention relates generally to methods and systems for carrying out adsorption processes and more particularly to a non-swing, meso-frequency traveling wave electro-kinetic system capable of use in purification/separation and/or refrigeration/heat pump processes.

2. Discussion of the Related Art

Adsorption is a process by which a gas or dissolved material is assimilated onto the surface of a solid or liquid material and defined in terms of adsorptive surface area per unit volume. In contrast, an absorption process entails incorporation of materials into the pores or interstitial spaces, as opposed to only the surface, of an absorbent material. An adsorbing material is called an adsorbent or sorbent. A material being adsorbed (or sorbed) is called the adsorbate or sorbate.

A number of different factors and mechanisms influence the adsorption process. For example, polar molecules are often more easily adsorbed. Similarly, molecules with small kinetic diameters can be preferentially adsorbed relative to molecules with larger kinetic diameters. Additionally, the condensation characteristics of the sorbate can also affect the adsorption process. Accordingly, adsorption systems can manipulate these mechanisms to separate components of complex mixtures and/or to effect selective vapor condensation.

A simple, traditional adsorption system has two separate vessels filled with adsorbent material. A complex compound is passed through the adsorbent material of one of the vessels causing a component of the complex compound to be removed from the feed stream. Once the adsorbent in the first vessel is no longer able to adsorb any more material, the feed stream is switched to the second adsorbent containing vessel. While the second vessel is adsorbing, the first vessel is being purged (i.e. desorbed) of the adsorbed material. Thereafter, the first vessel is substituted for the second vessel while the second vessel is purged. This process, known as "Swing Adsorption," is repeated as needed.

The material handling capacity of such adsorption systems depends on a number of variables, including vessel size (i.e. adsorbent mass), cycle time and operating pressure, as well as adsorbent/adsorbate affinity. For example, increasing vessel size, and hence the volume and mass of adsorbent, increases adsorption capacity. Similarly, decreasing the cycle time provides a concomitant increase of available adsorption sites per unit time. Increasing the operating pressure of the system also increases adsorption capacity per unit volume.

Liberation of the sorbed material from the adsorbent (i.e. desorption) can occur via a number of different mechanisms. Conventional adsorption systems employ either pressure reduction or temperature increase for removal of the adsorbate. Systems swinging between adsorption and pressure differential desorption are known as Pressure Swing Adsorption (PSA) systems. Alternatively, adsorption systems switching between adsorption and temperature differential desorption are known as Temperature Swing Adsorption (TSA) systems. Other desorption mechanisms exist, including electrical energy desorption (for dielectric and/or conductive adsorbents) and microwave irradiation of adsorbent/adsorbate complexes.

Regardless of the adsorption/desorption process employed, these systems require that an energy balance be maintained in the system. That is, energy that is dissipated during adsorption (as heat) must be reintroduced into the system during desorption. The most efficient adsorption systems, in terms of energy, are those containing the least amount of superfluous mass because heating and cooling a large vessel, a large volume of adsorbent and associated binder materials during the repeating cycles is a very wasteful process. As a result, the current trend is to toward lower mass, rapid cycle systems despite the fact that such measures have traditionally been associated with reducing adsorption efficiency.

Recent advances in the field of micro electromechanical systems (MEMS) research has led to proposals for incorporating micro-channel adsorption and reaction devices that provide for very short cycles with increased heat transfer capacities into traditional PSA and TSA systems. Such devices alternate the flow and pressure of complex compounds into and from adsorbent filled micro-channels (thus increasing surface volume with minimal effect on system size). For example, corrugated sheets have been impregnated or covered with thin layers of such adsorbent materials. Additionally, such systems offer the possibility of exceedingly short cycles times on the order of tenths of seconds. Accordingly, it is envisioned that such devices would be particularly well suited for use in small devices, such as oxygen enrichment systems for hospital patients.

SUMMARY OF THE INVENTION

The invention relates to a non-cyclic, meso-frequency traveling wave electro-kinetic system capable of use in purification/separation and/or refrigeration/heat pump processes. In particular, the below-described adsorption system can be used for fine or bulk chemical separations of liquid and gaseous materials. Similarly, the adsorption system can be readily adapted to function as a refrigeration/heat pump unit for use in heating and cooling systems. This reusable adsorption system provides high efficiency purification and/or cooling/heating with low energy demands and no moving parts. The invention can function in parallel or in series with other similar such adsorption units (though it can also operate as a single unit). Accordingly, the invention departs radically from other traditional adsorption systems.

Membranes function like filters in that they allow certain substances to pass through them while preventing others to pass through their pores and remain in the feed stream. Membranes are also very basic in their operation and require no special valving, switching or purging cycles. Adsorbents, on the other hand, are often complex chemical structures having powerful attractive forces and are capable of higher degrees of selectivity and molecular discrimination than membrane filters. The invention combines the attractive forces and high selectivity characteristics of adsorption systems with the simplistic and continuous operation qualities of membrane systems.

The invention provides an adsorbent system capable of continuous non-cyclic operation without large quantities of adsorbent and/or the valving requirements usually associated with such systems. In fact, the invention reduces the quantity of adsorbent required to an absolute minimum relative to traditional swing adsorption systems discussed above. Furthermore, the invention does not rely on large pressure and/or temperature differentials to operate and it has no moving parts. Also, the invention uses minimal desorption energy. The invention is also easily scalable;

thus, it can be manufactured and used by simple duplication and selective arrangement of an individually functioning and self-contained adsorption cell. At the most basic level, therefore, the invention is fundamentally different from traditional pressure swing and thermal swing adsorption systems.

The invention is capable of separating multiple or individual components from complex mixtures. Additionally, the invention can readily be configured to function as a vapor-condensing refrigeration/heat pump as well as a dehumidifying unit.

In one aspect, the invention includes three coplanar sheets of material forming a multi-layered architecture. Individual adsorbent units are shaped to be geometrically repeatable (e.g. triangles, squares, rectangles, hexagons, etc.) such that their outer edges are shared and that they are contiguous when duplicated. The units can be produced individually or, in the alternative, defined in larger numbers within areas on a larger substrate. In one embodiment, a number of adsorption units (pressed onto a top layer) can be disposed above a single, shared adsorbent layer accompanied. Thereafter, a heat-dissipating layer (as a solitary unit or as a pressed sheet) can be added below the adsorbent layer. In such a configuration, the top layer defines many individual adsorption units (or cells) even though only one large piece of adsorbent is utilized. Methods of preparing the invention can include laser ablation, LIGA processes, photo-lithographic patterning, mechanical or chemical etching, EDM, vapor spray, laser deposition, casting, injection molding, hydroforming, stamping, extruding, silk screening, electrodeposition, electroplating, electrodeless plating, electrostatic self-assembly and other related production techniques.

Depending on configuration and intended use, one or both of the outer most layers of the multi-layer structure function as heat rejection or collection surfaces (i.e. heat exchanges). For example, in a refrigeration/heat pump arrangement, both surfaces function as heat sinks. Arranged as a material separator, the lower surface can function to dissipate the heats of adsorption, as an outlet manifold, and/or as a component of an electric circuit, while the upper layer functions as an inlet/outlet manifold. These surfaces can be made of numerous materials including, but not limited to, metals, alloys, composites and matrix structures of heat conductive materials. The heat exchanging surfaces preferably have topography arranged to enhance the heat transfer characteristics of the surface materials (e.g. fins, microgrooves, etc.).

The central lamina of the structure contains, among other things, electrodes (i.e. inductors), electrode connections, inlet and outlet vias and adsorbent-containing chambers. The operative central layer can be made from cast or injection molded plastics, epoxies and other composites that are both thermally and electrically non-conductive. The active area of the central lamina (and of the adsorption cell) contains adsorbents, catalysts and/or other physical media amenable to adsorption, reaction, catalysis, condensation and transport of the sorbed materials.

The electrodes may be metallic (e.g. rhodium, palladium, chromium or alloys), or conductive plastics/epoxies containing conduction enhancing filler materials. The electrodes generate a traveling electric wave and/or an electric field flux/voltage spike that removes (or "sweeps") the sorbate from the sorbent whereby it is removed from the system. The electrodes are designed and configured to generate a traveling wave with a frequency generated between about 60-5,000,000 cycles per second and more preferably between about 5,000-1,000,000 cycles per second. The surface topography of the heat exchange material may interact with this wave or with another electric potential to bring about what is referred to as an electrohydrodynamic (EHD) heat exchange enhancement effect.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the invention, examples of which are illustrated in the drawings. This invention may, however, be embodied in many different forms and should not be construed as limited to the embodiments set forth herein. In addition and as will be appreciated by one of skill in the art, the invention may be embodied as a product, method, system or process.

Figure 1A:
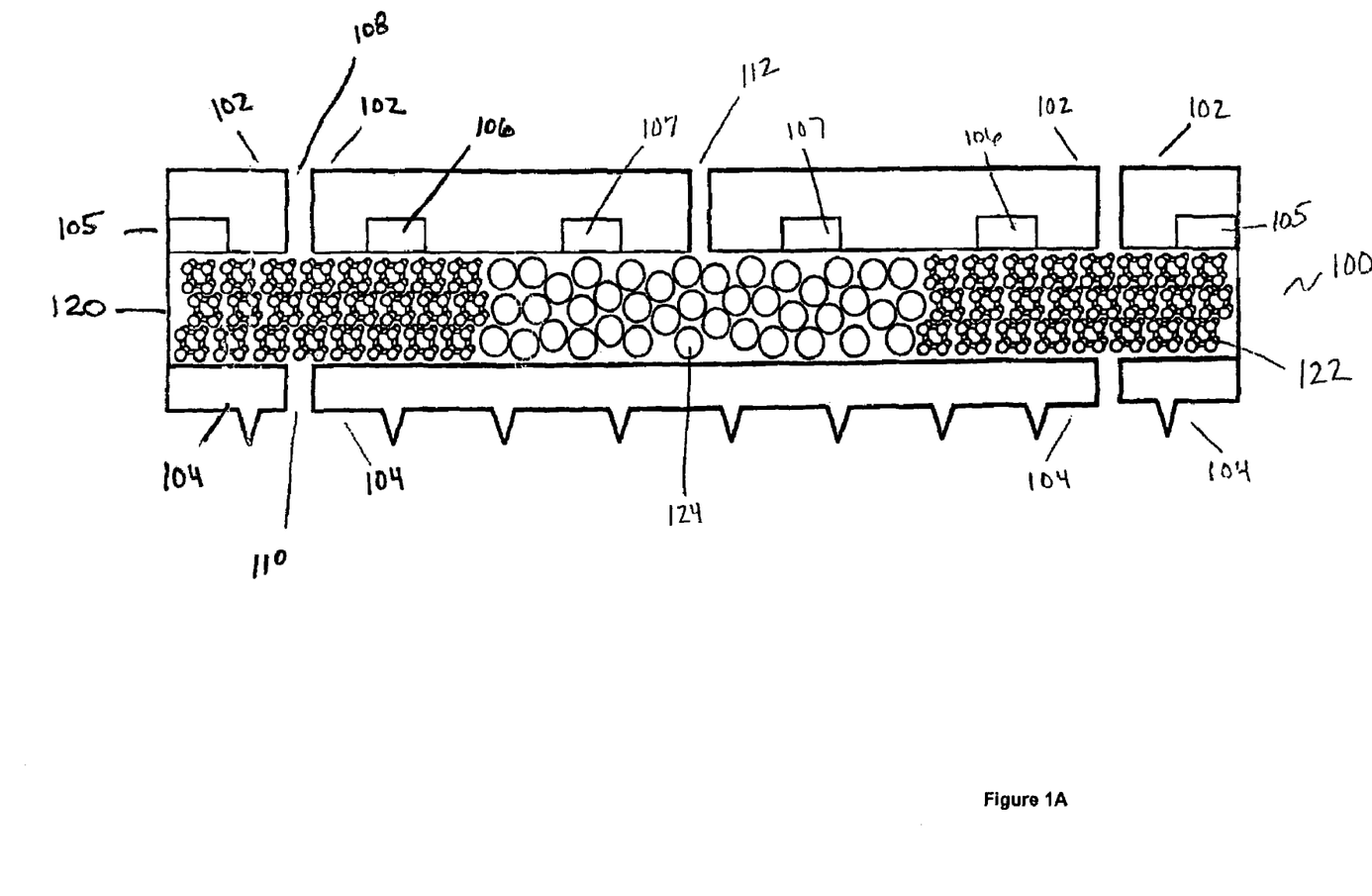
FIG. 1A illustrates a generalized representation of a meso-frequency traveling wave electro-kinetic adsorption unit in accordance with an embodiment of the invention.

FIG. 1A illustrates a side view of a generalized meso-frequency traveling wave electro kinetic adsorption cell 100 in accordance with an embodiment of the invention that is capable of being used alone or in series (i.e. many such cells located on a single surface or stacked). FIG. 1A shows a non-electrically conductive (i.e. dielectric) substrate surface 102 and a second substrate surface 104 that sandwich a macroporous layer of adsorbent material 120. The sandwiched macroporous adsorbent layer 120 contains any number of individual or combinations of adsorbent materials. Almost all of the adsorbents currently in use, and being developed, are suitable for inclusion into the architecture of the invention. Adsorbents may be mixed or layered to enhance selectivity or to bring to bear a multiplicity of adsorption mechanisms and characteristics and may contain catalysts and/or metallic particles. Suitable adsorbent materials for inclusion in the adsorbent layer 120 include, but are not limited to: zeolites (with various crystalline geometries), hydrophilic zeolites, hydrophobic zeolites, modified and/or metal-ion exchanged zeolites, natural or modified X type zeolites (including doping with binary divalent cation exchanged metals), faujasites, clinoptilolites, mordenites (and similar naturally occurring adsorbents suitable for metal-ion exchange modification), aluminophosphates, silico-aluminophosphates, metal-exchanged silico-aluminophosphates, uni-polar resins, bi-polar resins, aromatic crosslinked polystyrenic matrices, bromiated aromatic matrices, methacrylic ester copolymers, adsorbent carbonaceous materials, adsorbent graphitic materials, carbon fiber materials, nanotubes and/or related nano-materials, adsorbent metal salts (including, but not limited to perchlorates, oxalates, and alkaline earth metals).

The adsorbent materials in the adsorbent layer 120 can further include a variety of binder materials to control both macroporosity and microporosity characteristics of the adsorbent structure (through either homogenous or non-homogenous proportioning). These binder materials include, but are not limited to, clays (including naturally mined, calcined and/or chemically modified clays), smecite clays, kaolin clays, sub-bentonite clays, kaolin-halloysite clays, kaolin-kaolonite clays, kaolin-nacrite clays, kaolin-anauxite clays, binary matrix materials, tertiary matrix materials, silica-thoria, silica-alumina-, silica-alumina-thoria, silica-alumina-zirconia, fibrous materials, colloidal silica materials, colloidal alumina materials, colloidal zirconia materials, colloidal mixtures, surface modified amorphous silicon dioxide nanoparticles, hydrated magnesium aluminum silicates, organic binder materials, inorganic binder materials, sintered binder materials, sacrificial materials, prolyzed binder materials, slurry-formed binder materials, vapor-deposited binder materials, cast binder materials, electro-sprayed binder materials, eletrophoretically deposited binder materials, extruded binder materials, laser deposited binder materials, electron beam deposited binder materials, silk-screened binder materials, photo-lithography materials, LIGA-formed materials, electrostatically self-assembled materials and combinations thereof.

A plurality of electrodes (i.e. inductors), 105, 106 and 107 are disposed on the substrate layer 102 (though they can alternatively be disposed on or in the surface of the adsorbent layer 120) and may be connected in parallel to similar electrodes. The electrodes 105, 106 and 107 are spaced away from the center of the adsorption cell 100. While FIG. 1A demonstrates three electrodes 105, 106 and 107, the system in accordance with the invention can be configured to include any number of electrodes or, in the alternative, operate using only two such electrodes as needed or as permitted by space and/or cost considerations.

FIG. 1A also shows a plurality of inlet ports, or vias 108 disposed between the outer most electrode 105 and the adjacent electrode 106 of dielectric layer 102. Disposed on the substrate layer 104 are corresponding outlet vias 110. In the center of the adsorbent layer 120 is a collection via 112. The collection via 112 serves as the condensation and/or collection point for removal of the sorbed material(s) and may connect through to the substrate layer 104. As such, the collection via 112 may or may not pass through the second substrate layer 104 depending on the particular design limitations of the desired system.

The adsorbent layer 120 can consist entirely of the adsorbent material 122 or, as depicted in FIG. 1A, it can consist of microspheres or similar microstructures 124 in the immediate vicinity of the collection via 112. Adsorbent layer 120 can be a single continuous sheet of adsorbent material or can be defined as individual units of adsorbent material located proximate to other similar adsorbent units. Adsorbent layer 120 may be created to contain repeating patterns with porosity and/or material gradients designed to enhance electromigration, thermal diffusion and/or desorption characteristics. As depicted in FIG. 1A, the inlet vias 108 can pass through the adsorbent layer 120. In another embodiment, the adsorbent material of layer 120 may be arranged having no inlet vias 108 passing through it. In such an embodiment, the adsorbent layer 120 is arranged to be macroporous in the direction of the feed stream materials and microporous in the direction of the traveling electric field (i.e. in the direction of the collection via 112), thus allowing free passage of the feed stream through to the outlet vias 110 on substrate layer 104. In this particular design, it is not necessary for the adsorbent layer 120 to have defined vias as the macroporosity in the direction of the feed stream provides the same function The second substrate layer 104 can be made of the same non-conductive material as the first layer. Alternatively, the substrate layer 104 can be made of a conductive (or non-conductive) thermal interface/heat exchange material.

In operation, the adsorption cell 100 can operate alone, in parallel and/or in series for complex chemical or molecular purification. A liquid or gaseous feed stream enters the adsorption cell 100 through the inlet vias 108 in the substrate layer 102. The liquid or gaseous feed steam can optionally be exposed to a filter and/or a catalyst(s) material prior to entering said adsorption cell 100. The vias 108 allow complex or multi-component gaseous or liquid feed streams to pass through the substrate layer 102 and come in contact with the adsorbent layer 120 whereby a component(s) is removed (or sorbed) from the feed steam. The non-sorbed components of the feed stream passes through the adsorbent layer 120 and exit the adsorption cell 100 through the outlet vias 110 located on the substrate layer 104.

Simultaneous with the adsorption occurring at the adsorbent layer 120, the electrodes 105, 106 and 107 are charged with a polyphase electric potential and/or field flux (or voltage spike) resulting in a traveling electric field directed to the center of the adsorption cell 100 (i.e. in the direction of the collection via 112). Electrodes 105, 106 and 107 are connected in parallel to other similar electrodes and each corresponds to one phase of the applied polyphase electric potential. This traveling electric field can be superimposed (or impinged with) a relatively short duration electric field flux as it moves from the outermost electrode 105 toward the center of the structure. Operated in this manner, two simultaneous mechanisms act to remove adsorbate from the adsorbent layer 120. First, the continuous traveling wave constantly sweeps the adsorbent layer 120 to remove non-bonded adsorbate. Simultaneously, the electric field flux provides energy to break the sorbate-sorbent bonds of bound materials. Once freed from the adsorbent, the adsorbate is removed from the system by the traveling wave. The traveling electric field and field flux are provided to the adsorption cell through a coupled power source and/or a coupled signal generator either or both of which are capable of producing poly-phased or multi-phased electric signals.

The traveling electric wave traverses the adsorbent layer 120 and sweeps any adsorbed materials in the direction of the collection via 112. Movement of the sorbed materials is due to the sorbed compound being energized by the traveling electric field and the sorbate-sorbent bond being temporarily broken. The unbound sorbate (i.e. desorbed material) is biased toward the center of the adsorbent layer 120 as a result of the traveling wave's field gradient (which may also include effects due to an applied voltage spike). The desorbed material can be re-adsorbed into the adsorbent layer 120 (albeit closer to the collection via 112) or exit the adsorbent layer either through the collection via 112 or by being re-entrained in continuous feed steam. Re-entrainment in the feed steam, however, is disfavored due to the considerably stronger re-adsorptive forces and electrokinetic forces.

As an example, air containing water ($H_2O$) may be introduced into the adsorption cell 100 through the inlet vias 108 and into the substrate layer 104. The air containing water enters the adsorbent layer 120 where the water is adsorbed and then directed to the collection via 112. The remaining non-sorbed material (in the this case, dehydrated air) leaves the cell 100 through the outlet vias 110. In this example, the adsorbent may be any material capable of adsorbing water, such as a cubic alumino-silicate.

Inclusion of the microstructures 124 helps draw sorbate material from the adsorbent layer 120 by reducing the need to provide energy for breaking sorbate-sorbent bonds near the collection via 112, while still retaining a packed capillary enhanced electrokinetic mass transport effect.

The adsorbent material of layer 120 may be arranged such that it is macroporous in the direction of the flow of gaseous and liquid materials and microporous in the direction of the traveling electric field (i.e. in the direction of the collection via 112). Arranged in this fashion, pressure forces dominate the throughput (mass convection) rate while electro-osmotic, electro-migratory and/or dielectrophoretic forces dominate the sorbate diffusion rate. This arrangement can also enhance the effects of the traveling electric field due to polarization of the sorbate molecules. Use of heat exchange materials to make up the substrate layers 102 and/or 104 further enhances the process by providing a means for drawing off and dissipating the heat of adsorption and/or heat of compression or condensation.

Figure 1B:
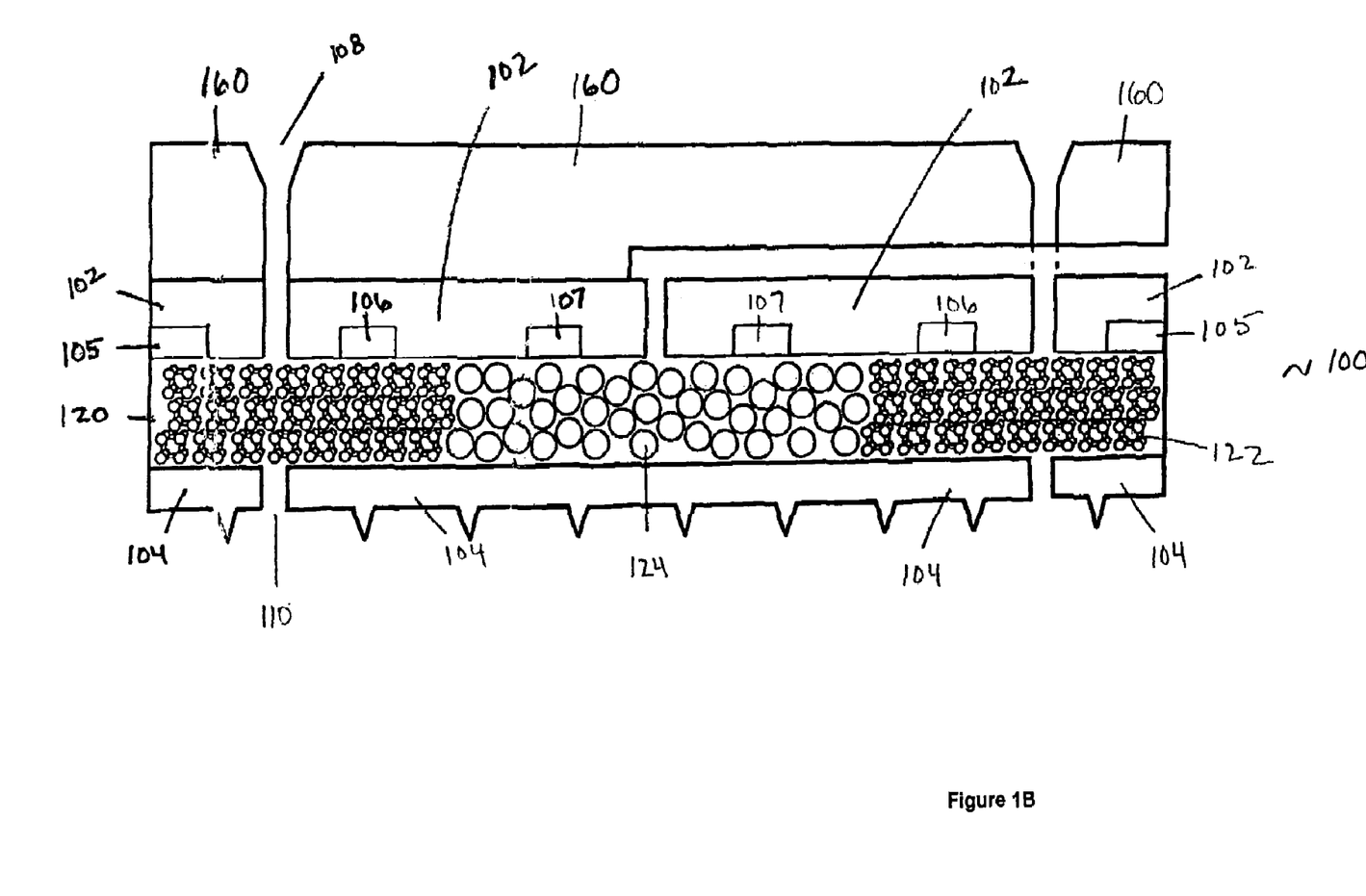
FIG. 1B illustrates the adsorbtion unit of FIG. 1A with a manifold assembly included.

FIG. 1B shows a generalized meso-frequency traveling wave electrokinetic adsorbtion cell according to another embodiment of the invention. The cell 100 of FIG. 1B is the same as the cell 100 of FIG. 1A, except that FIG. 1B also depicts a manifold mechanism 160 that provides a number of functions, including removing an adsorbed material, providing a feed stream, directing materials toward the adsorption unit (in some cases) or alternatively, directing material away from the adsorption unit.

Figure 1C:
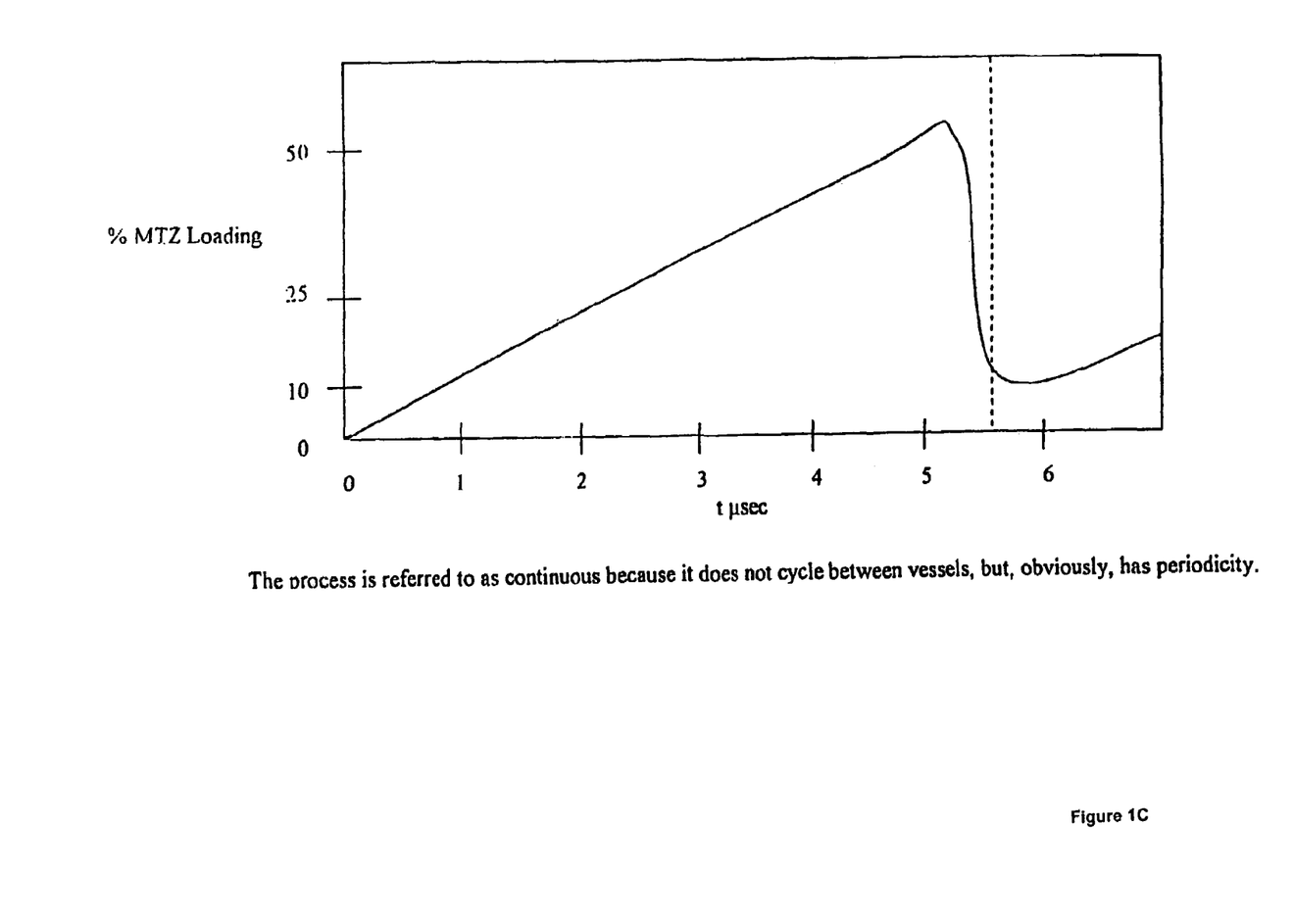
FIG. 1C is a graph of the change in % MTZ loading over time for a continuous non-swing system in accordance with the invention.

FIG. 1C is a graph illustrating the change in the percentage of MTZ loading over time. This graph illustrates how the processes carried out by the cell 100 are continuous and non-binary. According to the invention, the cell 100 does not cycle between different vessels or adsorptive materials.

Figure 2:
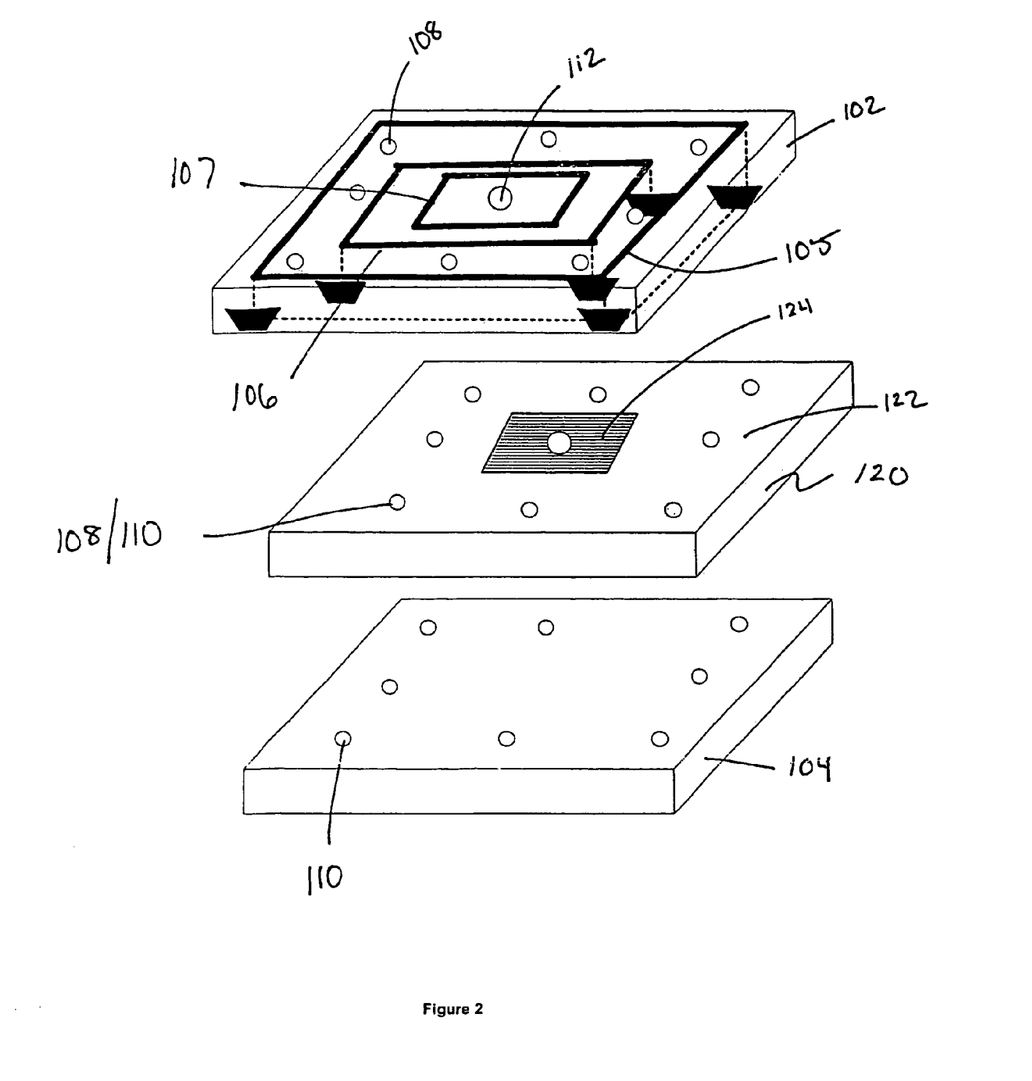
FIG. 2 illustrates a top-down view of FIG. 1A.

FIG. 2 illustrates a top-down view of adsorption unit 100 as depicted in FIG. 1A and described above. Thus, FIG. 2 includes the non-electrically conductive substrate surface 102, the adsorbent material 104, the electrodes 105, 106 and 107, the vias 108 and 110, the collection via 112, the adsorbent material 120, the adsorbent material 122 and the microstructures 124.

Figure 3:
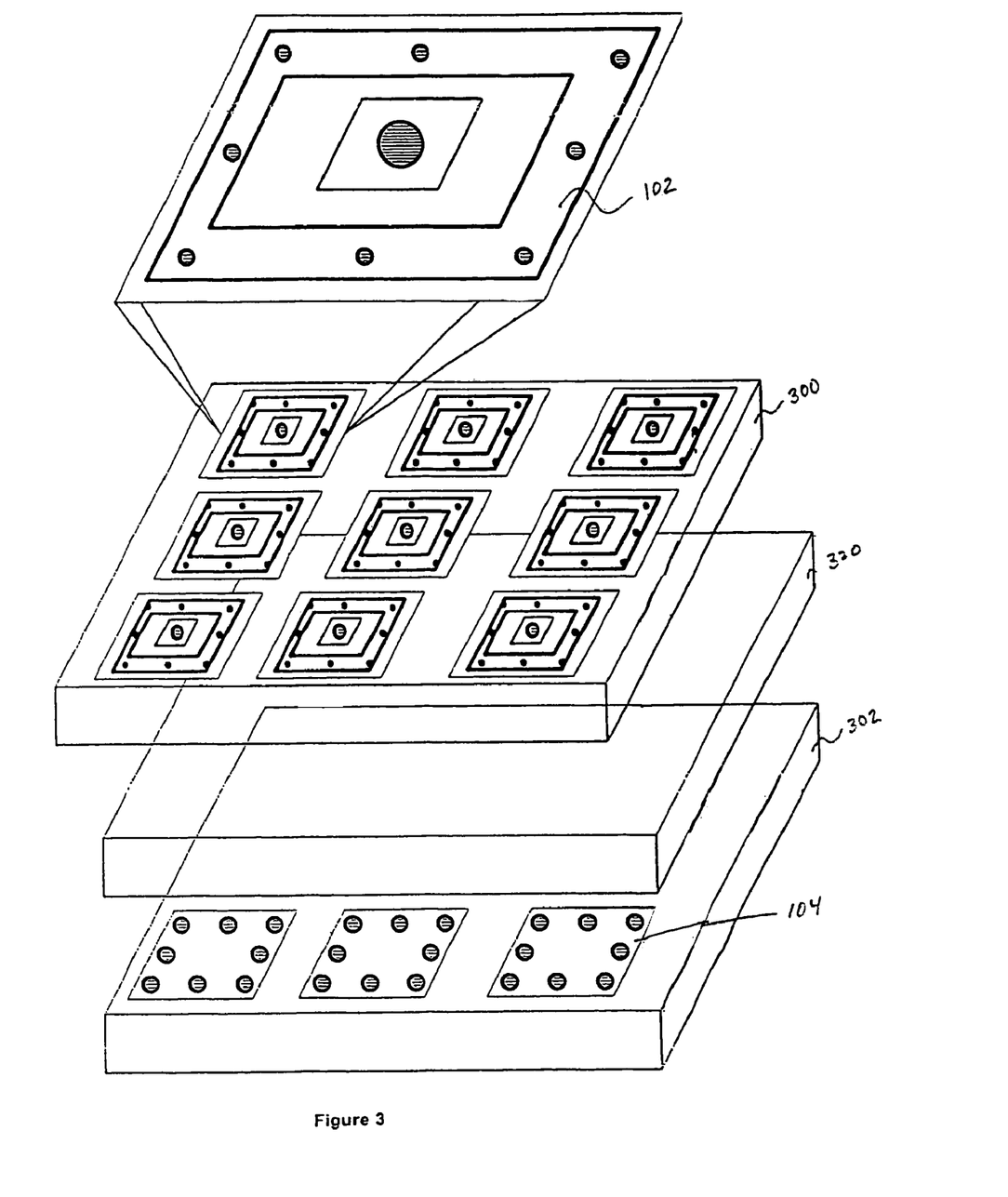
FIG. 3 illustrates another embodiment of FIG. 1A in which multiple adsorption units comprise a sheet disposed above a single adsorbent layer.

FIG. 3 illustrates a scaled version of FIG. 2 in which multiple adsorption units comprise a sheet disposed above a single adsorbent layer. In FIG. 3, a series of dielectric layers 102 are disposed together in parallel, forming a single dielectric layer 300. The surface layer 300 is disposed above a much larger, single layer of adsorbent material 120 (rather than an individually defined cell of adsorbent material as discussed above). Disposed below adsorbent layer 120, is a parallel series of substrate layers 104 (from FIG. 1A) forming a single substrate layer 302. Arranged in this manner, the each individual adsorption unit works as described above as part of an adsorption system.

Figure 4:
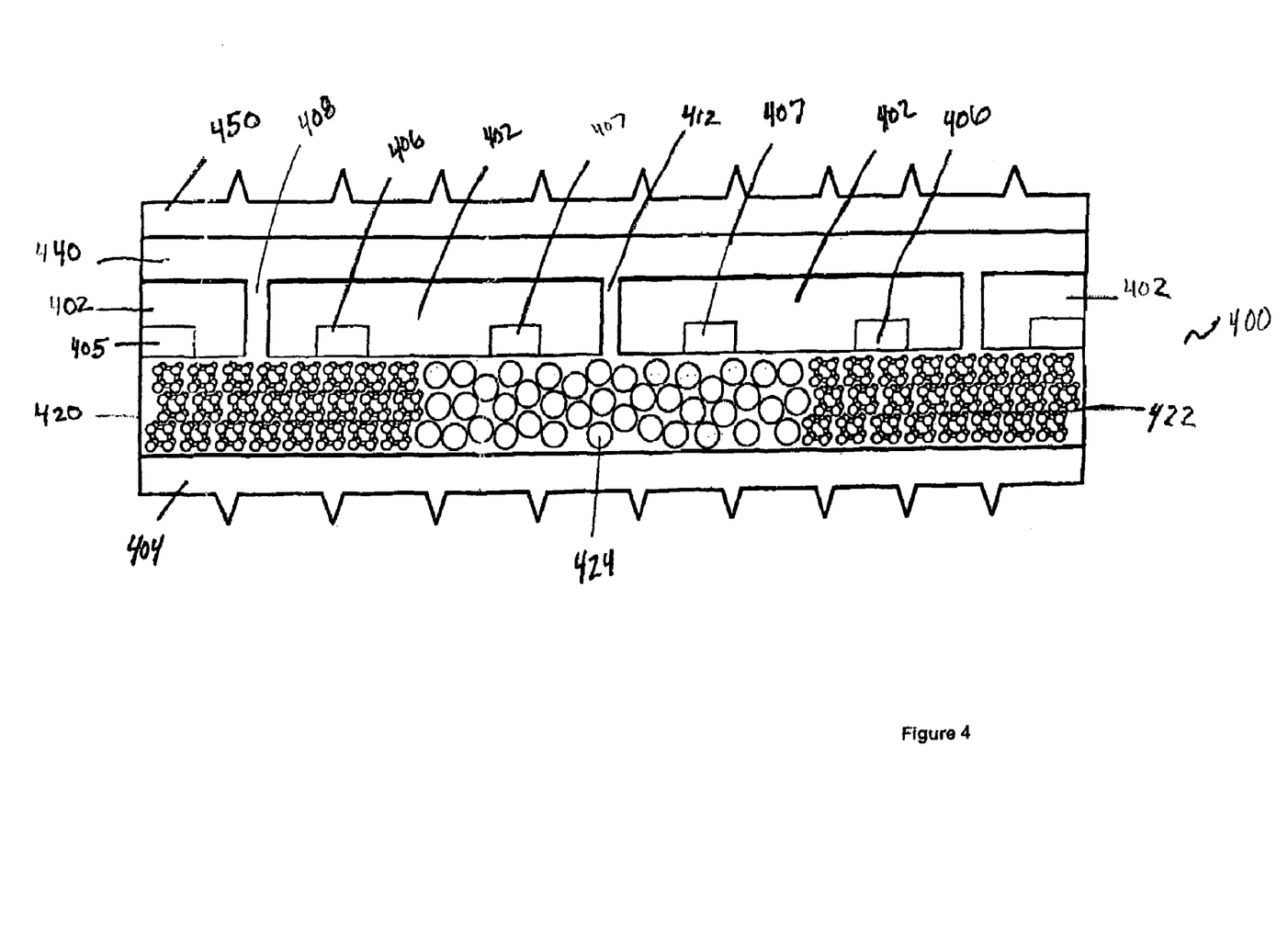
FIG. 4 illustrates a generalized closed cycle (refrigeration/heat pump) meso-frequency traveling wave electro kinetic adsorption unit in accordance with an embodiment of the invention.

FIG. 4 illustrates a side view of a generalized closed cycle (refrigeration/heat pump) meso-frequency traveling wave electro kinetic adsorption cell in accordance with an embodiment of the invention. The adsorption cell of FIG. 1A can be configured to function as part of a closed-cycle or refrigeration/heat pump system 400 by disposing a second heat exchange layer 450 atop a substrate layer 402 and creating an evaporation chamber 440. In this configuration, the closed loop system may or may not have outlet vias 410 located on a second substrate layer 404.

In this design, the adsorption cell functions as a closed loop system (i.e. a working fluid 430 (not shown)is continuously recycled throughout the system). The working fluid 430 is selected to be specifically compatible with the sorbent material so as to operate within pre-selected temperature parameters and where the sorbent has low energy bond-breakage requirements. The desorption phase of the closed loop system is preferably designed to be essentially non-thermal and/or non-ohmic.

In operation, the working fluid 430 of the closed loop system is in a gaseous state as it is drawn through an inlet via 408 into an adsorbent layer 420 due attractive forces between the working fluid and solid sorbent material. During this process, the heat of adsorption is conducted by a heat exchange surface 404 to the external environment. Transfer of the heat to the external environment is facilitated providing a laminar structure with a short heat diffusion path length.

Once adsorbed, the sorbed material is moved toward the center of the adsorbent layer 420 in the direction of a collection via 412, as discussed above. Movement of the sorbed material occurs due to the bond-breaking energy and electrokinetic energy supplied by the traveling electric wave generated by electrodes 405, 406 and 407. The electrodes 405, 406 and 407 are connected in parallel with other similar electrodes and each corresponds to one phase of the applied polyphase electric potential discussed above. Depending on design, the central region of the sorbent layer 420 in proximity of the collection via 412 may consist of microstructures 424 rather than the adsorbent material 422. As discussed above, the traveling electric field and field flux are provided to the adsorption cell through a coupled power source and/or a coupled signal generator either or both of which are capable of producing poly-phased or multi-phased electric signals.

As the sorbed material moves to the center of the sorbent layer 420, it consists of a heated gas-liquid mixture. Due to the system design, the liquid-gas mixture is forced into a region of decreasing volume. As a result, the mixture is further condensed to the liquid state resulting in additional heat rejection and cooling (whereby the additional heat is drained away via the heat exchange surface 404).

After the sorbed liquid is cooled, it enters the evaporator chamber 402 through the collection via 412. The evaporator chamber 402 is maintained at a low pressure causing the liquid sorbate entering the chamber to boil. As such, the phase changed sorbate removes heat from the external environment through the heat exchange surface 400.

In one embodiment of the invention, a heat sensor or thermocouple (not shown) may be embedded on one or more of the heat exchange surfaces. This allows the adsorption cell to provide for temperature feedback, and thus, temperature regulation.

In an embodiment of the invention, the adsorption unit can be layered with other similar refrigeration/heat pump to produce a cascade-type cryogenic cooler system. In such an arrangement, a series of adsorption cells are layered together to produce incrementally increasing temperature differentials. Each descending unit of such an arrangement employs refrigerants having progressively lower boiling points. For example, in a three-tiered cryogenic natural gas liquefaction system, the refrigerants could include ammonia, ethylene and methane as the refrigerants. Conversely, a similar multistage arrangement could be used for differential heat recovery for use with, among other things, waste heat recovery systems.

Figure 5:
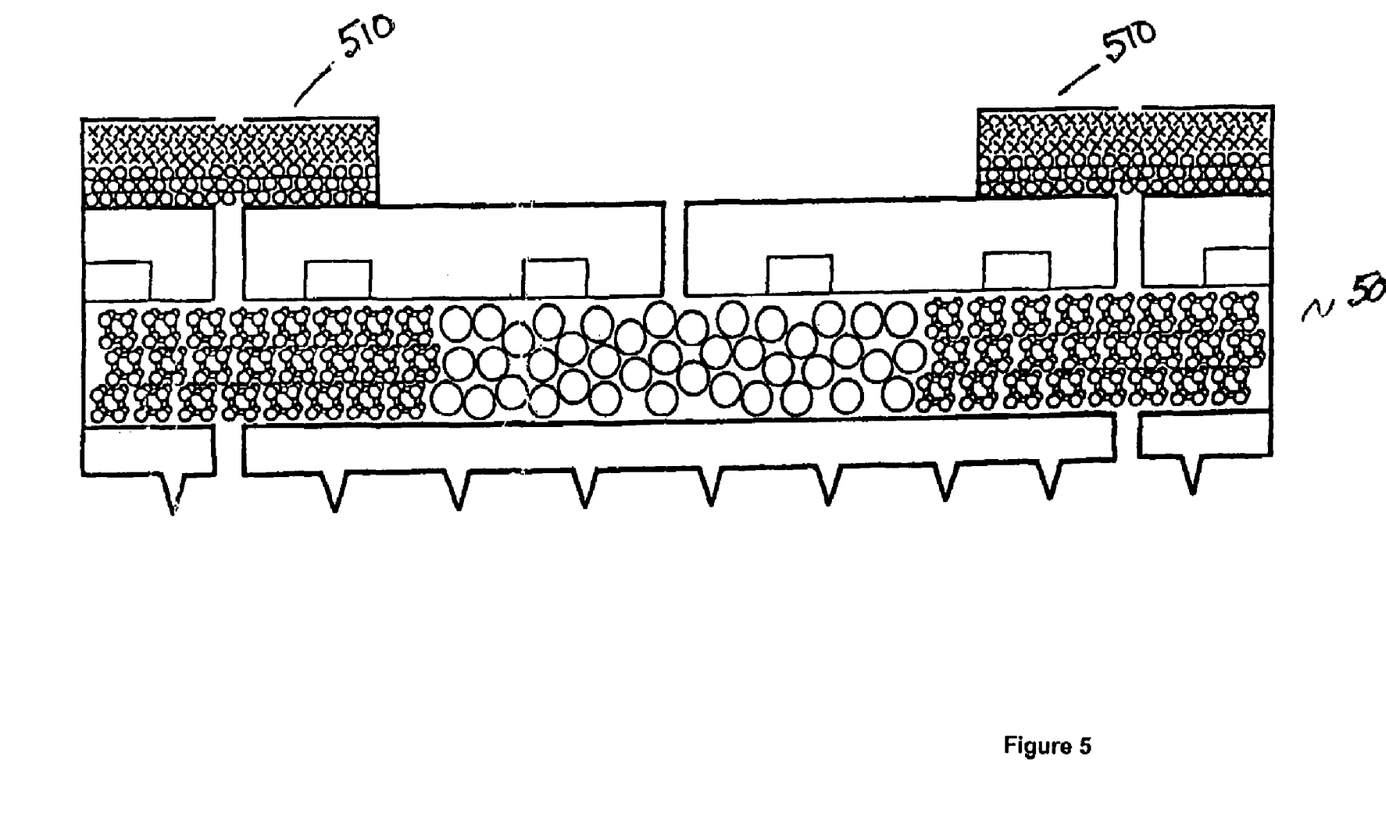
FIG. 5 illustrates an embodiment of the adsorption unit including a catalyst.

FIG. 5 illustrates another embodiment of a generalized meso-frequency traveling wave electro kinetic adsorption cell 500. The cell 500 of FIG. 5 is identical as to the cell 100 of FIG. 1 except that it also includes a surface catalyst layer over a non-electrically conductive substrate 510. This allows for catalytic reaction to take place before liquid or gaseous feed stream enters the rest of the cell 500.

With respect to the above disclosures, it should be understood that the term "layer" is meant to refer to an area or volume, and does not necessarily define a discrete or separate lamina, and, indeed, the transition between "layers" may be gradual and amorphous. In addition, structures such as electrodes, vias, buses, heat exchange surfaces and mass transport zones may be manufactured by such techniques as electrostatic self assembly that will render them non-discrete, yet functional areas of the device.

It will be apparent to those skilled in the art that various modifications and variations can be made in the present invention and specific examples provided herein without departing from the spirit or scope of the invention. Thus, it is intended that the present invention covers the modifications and variations of this invention that come within the scope of any claims and their equivalents.

What is claimed is:

1. A process for separating materials, comprising the steps of:
   introducing a plurality of substances to at least one adsorbent material; adsorbing at least one substance of said plurality of substances;
   electrically charging the adsorbent material so as to generate a traveling electric field to desorb said at least one adsorbed substance; and
   electrokinetically removing said at least one adsorbed substance from the at least one adsorbent material with said traveling electric field.

2. The process of claim 1, further comprising the step of filtering said plurality of substances.

3. The process of claim 1, further comprising the step of exposing said plurality of substances to one of an electro-positive or an electro-negative material.

4. The process of claim 1, further comprising the step of exposing said plurality of substances to a catalyst material.

5. The process of claim 1, further comprising the step of collecting said at least one removed substance.

6. The process of claim 1, wherein said electric field is one of a traveling electric field, an electric field flux, a voltage spike, a polyphase electric potential, an electric field gradient and combination thereof.

7. The process of claim 1, further comprising at least one of the steps of allowing any non-adsorbed substances of said plurality of substances to be removed from the adsorption unit, collecting any non-adsorbed substances of said plurality of substances, recycling any non-adsorbed substances of said plurality of substances and subjecting any non-adsorbed substances of said plurality of substances to at least one additional purification step.

8. The process of claim 1, further comprising the step of polarizing at least one of said substances of said combination of substances.

9. The process of claim 1, wherein said plurality of substances is at least one of a gas, a liquid and mixtures thereof.

10. The process of claim 1, wherein said process is exothermic.

11. The process of claim 1, wherein at least one of said plurality of substances is oxygen, air, water, p-xylene, o-xylene, a hydrocarbon, an aromatic hydrocarbon, a heavy metal, a virus, a bacterium, a pathogen, a volatile organic compound, a salt, a vapor, a gas, a liquid and a particle.

12. A process for thermal management, comprising the steps of:
   exposing a working fluid to at least one adsorbent unit; electrically charging said adsorbent material so as to generate a traveling electric field; adsorbing said working fluid within said adsorbent layer; condensing said adsorbed working fluid from said adsorbent layer; electrokinetically removing said adsorbed working fluid from said adsorbent layer with said traveling electric field; and re-exposing said working fluid to said adsorbent unit.

13. The process of claim 12, wherein said adsorbent unit is a closed adsorbent unit.

14. The process of claim 12, further comprising the step of collecting said removed working fluid from said adsorbent layer.

15. The process of claim 12, wherein said working fluid is at least one of a refrigerant, of a halocarbon compound, a cyclic-organic compound, a azeotropic compound, an aliphatic hydrocarbon compound, an oxygen-containing compound, a nitrogen-containing compound, a sulfur-containing compound, an inorganic compound, an unsaturated organic compound, a gaseous compound and combinations thereof.

16. The process of claim 12, wherein said step of exposing said working fluid to said adsorbent unit is at least one of pumping a gas feed stream, pumping a liquid feed stream, passing a gas feed stream, passing a liquid feed stream, opening a gas feed stream, opening a liquid feed stream and combinations thereof.

* * * * *